# United States Patent [19]

Hagen

[11] 3,919,964
[45] Nov. 18, 1975

[54] MARINE PROPULSION REVERSING TRANSMISSION WITH HYDRAULIC ASSIST

[75] Inventor: Marcus W. Hagen, Kenosha, Wis.

[73] Assignee: Outboard Marine Corporation, Waukegan, Ill.

[22] Filed: Aug. 12, 1974

[21] Appl. No.: 496,650

Related U.S. Application Data

[63] Continuation of Ser. No. 249,905, May 3, 1972, abandoned.

[52] U.S. Cl. .................... 115/34 R; 91/378; 115/17
[51] Int. Cl.² ..................... B63H 5/12; B63H 21/28
[58] Field of Search ........ 115/17, 18 R, 18 A, 34 R, 115/35, 41 R; 192/21, 48.91, 93 R; 74/335, 378, 388 R, 388 PS; 91/376, 377, 378; 60/479, 489

[56] References Cited
UNITED STATES PATENTS

| | | | |
|---|---|---|---|
| 1,918,985 | 7/1933 | Robson | 91/378 |
| 2,117,852 | 5/1938 | Pearmain | 192/21 |
| 2,696,188 | 12/1954 | Armstrong et al. | 115/18 R |
| 2,926,635 | 3/1960 | Leonard et al. | 91/378 |
| 3,430,604 | 3/1969 | Pike et al. | 115/41 R |
| 3,455,420 | 7/1969 | Blanchard, Jr. | 192/93 R |

*Primary Examiner*—Trygve M. Blix
*Assistant Examiner*—Charles E. Frankfort
*Attorney, Agent, or Firm*—Michael, Best & Friedrich

[57] ABSTRACT

Disclosed herein is a marine propulsion device comprising a reversing transmission located in a propulsion unit and connecting a drive shaft to a propeller shaft and shiftable between neutral, forward drive, and rearward drive condition, together with a mechanical linkage extending in the propulsion unit and connected to the reversing transmission for operating the reversing transmission in response to movement of the mechanical linkage, and a hydramlic arrangement actuated in response to initial movement of the mechanical linkage for assisting in moving the mechanical linkage to operate the reversing transmission. The mechanical linkage includes a shift actuator carried by the propeller shaft for common rotary movement with the propeller shaft and for axial movement relative to the propeller shaft and connected to a clutch dog for common movement therewith, together with a rod movable transversely of the shift actuator, and a coupling connecting the rod and the shift actuator for effecting shift actuator movement in one direction axially of the propeller shaft in response to rod movement in one direction transversely of the propeller shaft and for effecting shift actuator movement in the other direction in response to rod movement in the other direction and for simultaneously permitting rotary shift actuator movement relative to the rod.

27 Claims, 7 Drawing Figures

`

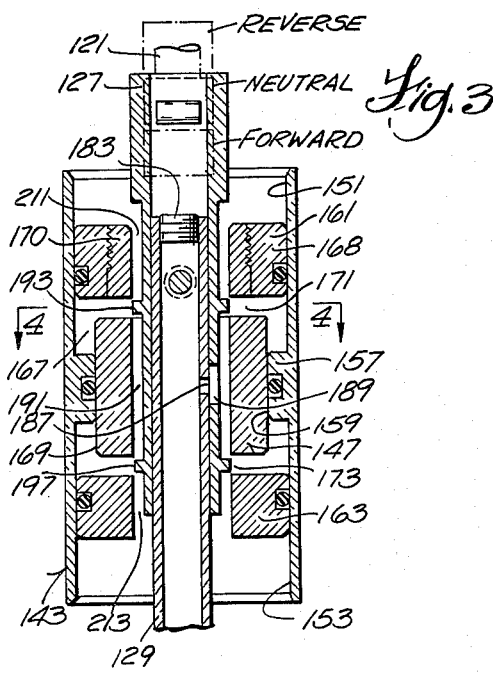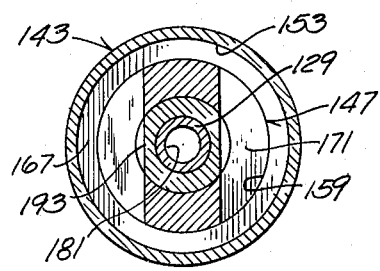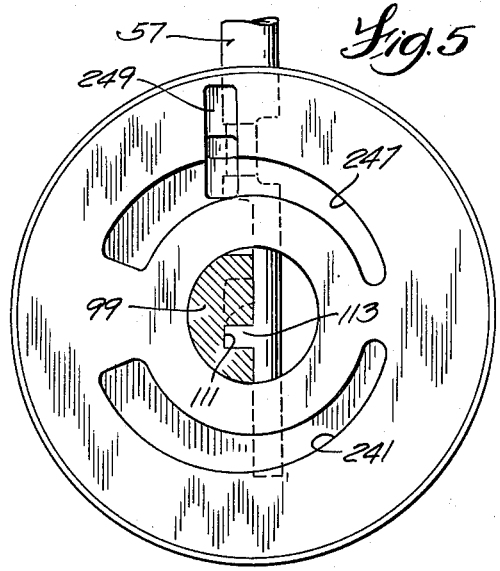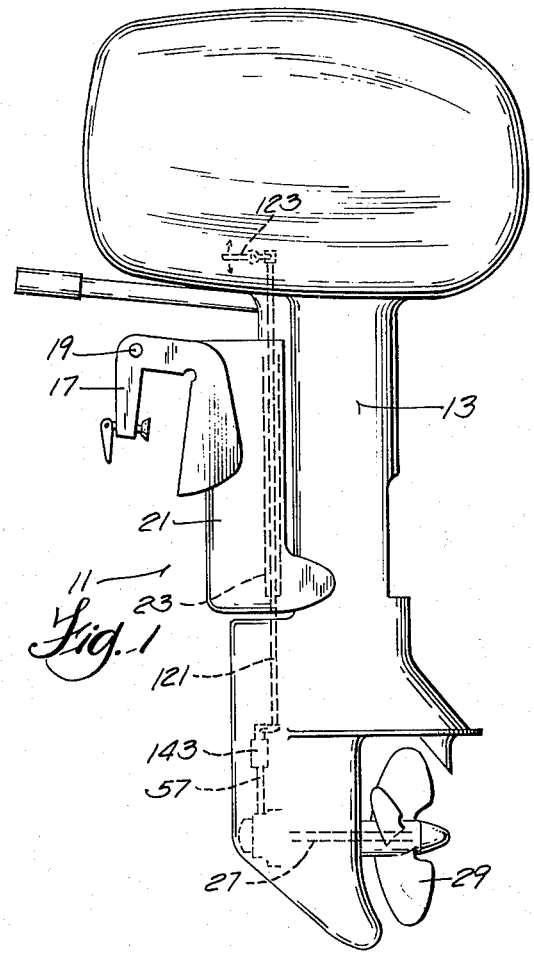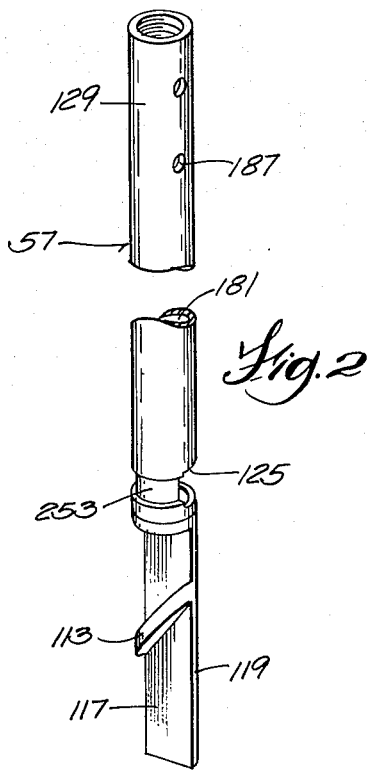

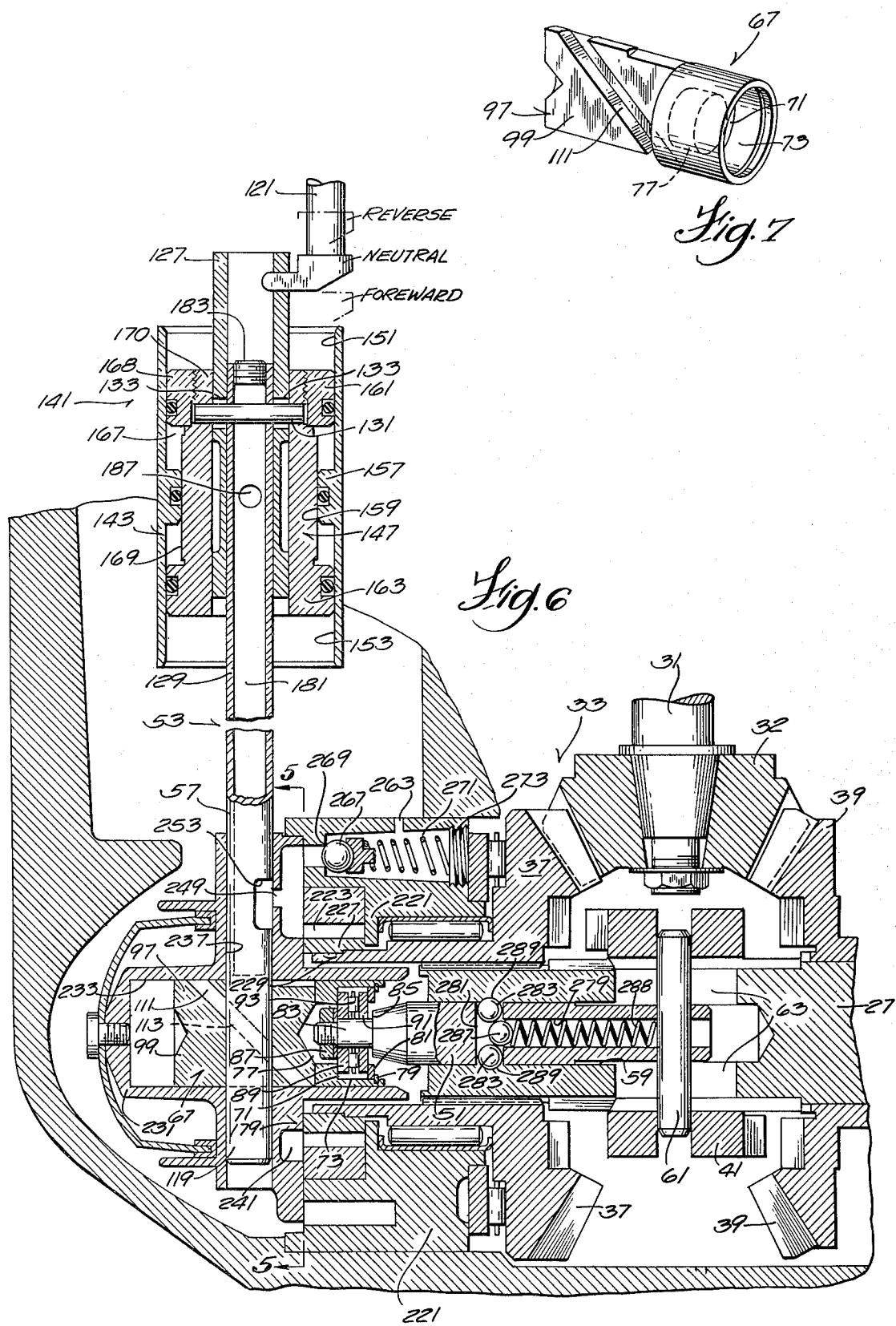

MARINE PROPULSION REVERSING TRANSMISSION WITH HYDRAULIC ASSIST

This application is a continuation of my application Ser. No. 249,905 filed May 3, 1972 and now abandoned.

BACKGROUND OF THE INVENTION

The invention relates generally to marine propulsion devices, and particularly to devices such as outboard motors and stern drive units which include propulsion units arranged for vertically tiltable and horizontally swingable movement and including a propeller shaft connected to a drive shaft through a reversing transmission.

The invention also relates to mechanical and hydraulic arrangements for shifting such reversing mechanisms.

In the past, various reversing transmissions have experienced considerable wear due to slow engagement and due to less than full engagement. Furthermore, the possibility of such wear increases with increased loading of such transmissions.

Examples of prior arrangements for actuating a reversing mechanism in a marine propulsion device are disclosed in the Kiekhaefer U.S. Pat. No. 2,718,792, issued Sept. 27, 1955, in the Ziegler U.S. Pat. No. 3,119,277, issued Jan. 28, 1964, and in the Shimanckas U.S. Pat. No. 3,623,583, issued Nov. 30, 1971.

SUMMARY OF THE INVENTION

The invention provides a marine propulsion device including a reversing transmission shiftable between a neutral condition and a drive condition, and a linkage which is mechanically connected to the reversing transmission to effect shifting thereof both to and from neutral by forces transmitted through the linkage to the reversing transmission, together with a hydraulic arrangement for assisting in moving the linkage to shift the reversing transmission.

More particularly, and in accordance with the invention, the linkage includes first and second elements which are connected by means providing a limited amount of lost motion upon initial movement of the first element relative to the second element. In addition, the first element also constitutes a valve member which controls actuation of the hydraulic assist means and which, during initial linkage movement, moves relative to a member including controlled port means so as to cause continued linkage movement assisted by hydraulic pressure. Thus, in operation, initial movement of the linkage causes actuation of the hydraulic means which thereafter generates a force which continues movement of the linkage subject to operator control of the first element and which, after engagement of the transmission, serves to continually maintain the transmission in engaged condition.

In further accordance with the invention, positive mechanical actuation of the reversing transmission by the linkage both to and from neutral condition is afforded by inclusion of a shift actuator which is mounted in an axial bore in the propeller shaft for common rotary movement with the propeller shaft and for axial movement relative to the propeller shaft and which is connected to a clutch dog for common movement therewith. In addition, the linkage includes a rod which can constitute the before mentioned second element and which is movable transversely of the propeller shaft axis, together with means connecting the rod to the shift actuator to effect movement of the shift actuator in one direction axially of the propeller shaft in response to movement of the rod in one direction transversely of the propeller shaft axis and to effect movement of the shift actuator in the other direction axially of the propeller shaft in response to movement of the rod in the other direction transversely of the propeller shaft axis, together with means permitting rotary movement of the shift actuator relative to the rod.

In one embodiment of the invention, the connecting means includes a plunger which is guided for movement axially of the propeller shaft, together with means on the plunger and on the shift actuator for affording common movement of the plunger and shift actuator axially of the propeller shaft while affording rotary movement therebetween. In addition, the plunger and the rod include interengaging means affording plunger movement in response to rod movement.

The hydraulic arrangement for assisting in moving the linkage subsequent to initial linkage movement includes the before mentioned valve member which is telescopically arranged around a portion of the rod, together with a piston which includes the before mentioned port means and which is telescopically arranged around the valve member and telescopically engaged in a cylinder member fixed in the propulsion unit. The piston includes, on its outer surface, a centrally arranged recess having an outer cylindrical surface which engages a radially inwardly extending boss or flange on the cylinder so as to divide the recess into upper and lower portions. Each of the upper and lower piston recess portions communicates with respective upper and lower ports subject to control by lands provided on the valve member on opposite sides of a recess which communicates through suitable openings with a bore in the rod notwithstanding relative movement between the rod and the valve member. In turn, the rod includes a port which communicates, notwithstanding movement of the rod, with the outlet of an engine driven fluid pump. The means which connects the valve member and the rod for limited initial lost motion also serves to connect the piston and the rod for common movement.

Thus, in operation, initial movement of the valve member by the operator serves to selectively expose the upper or lower piston recess portions to pressure fluid and thereby to drive the piston and connected rod relative to the cylinder and to the propulsion unit so as to axially shift the plunger and connected shift actuator.

Also in accordance with the invention, there is provided yieldable means on the linkage for releasably preventing linkage movement from a position locating the transmission in neutral condition in the absence of a force above a predetermined amount. In one embodiment in accordance with the invention, such means is located between the shift actuator and the propeller shaft and provides a "feel" for the operator informing him of when the transmission is in neutral. In addition, the yieldable means for releasably preventing linkage movement serves to assist in proper assembly of the components of the transmission actuating mechanism in proper relation to one another.

As already indicated, the yieldable means for releasably preventing linkage movement requires a force of preselected magnitude to effect displacement from the neutral position. Such a greater force is provided in accordance with the invention by the hydraulic means which serves to rapidly and positively drive the clutch dog into engagement and to maintain such engagement so long as the engine is running and the operator does not otherwise actuate the mechanism.

Such rapid and positive or full engagement of the clutch dog serves to avoid excessive wear on the reversing transmission and increases clutch life. In addition, the hydraulic assist facilitates shifting, particularly in higher horsepower devices, by doing the "work" for the operator. If for some reason the hydraulic means is inoperative, the linkage is nevertheless operative to displace the transmission from neutral by reason of transmission through the linkage by the operator of a force sufficient to overcome the yieldable means restraining displacement of the reversing transmission from neutral.

One of the principal objects of the invention is the provision of a hydraulically assisted mechanism for shifting a reversing transmission in a marine propulsion device.

Another of the principal objects of the invention is the provision of a hydraulically assisted mechanical linkage for shifting a reversing transmission.

Another of the principal objects of the invention is the provision of a mechanical linkage which is operable to effect shifting of a reversing transmission and which includes a connection affording limited lost motion between two linkage members and wherein a hydraulic mechanism is actuated during such lost motion to thereafter assist in continued linkage movement which is effective to change the condition of the reversing mechanism.

Another of the principal objects of the invention is the provision of a reversing transmission which is hydraulically assisted and which includes yieldable detent means for restraining actuation of the reversing transmission from neutral in the absence of the application of a force above a predetermined amount.

Another of the principal objects of the invention is the provision of a mechanical linkage including a shift actuating member which is rotatable with the propeller shaft and movable axially relative thereto and which is connected to an actuating rod movable transversely of the propeller shaft so as to positively displace the actuating member in both directions in response to actuator rod displacement while affording relative rotation of the actuating member relative to the actuating rod.

Another of the principal objects of the invention is the provision of hydraulic means operable continually during engine operation to maintain engagement of the reversing transmission.

Other objects and advantages of the invention will become known by reference to the following description, claims and accompanying drawings.

DRAWINGS

FIG. 1 is a side elevational view of an outboard motor embodying various of the features of the invention.

FIG. 2 is an enlarged perspective view, partially broken away, of one of the components, i.e., the rod 57, embodied in the outboard motor shown in FIG. 2.

FIG. 3 is a fragmentary view, partially in section, of various of the components embodied in the outboard motor shown in FIG. 1. In FIG. 3, the components are shown in their neutral position in full lines and the link 121 is shown, in dotted outline, in both the forward and rearward drive positions which are accordingly labled.

FIG. 4 is a sectional view taken along line 4—4 of FIG. 3.

FIG. 5 is a sectional view taken along line 5—5 of FIG. 6.

FIG. 6 is an enlarged elevational view, partially broken away and in section, of the reversing transmission and actuating mechanism incorporated in the outboard motor shown in FIG. 1.

FIG. 7 is a perspective view of another of the components, i.e., the plunger 67, incorporated in the outboard motor shown in FIG. 1.

Before explaining the invention in detail, it is to be understood that the invention is not limited in its application to the details of construction and arrangement of parts set forth in the following general description or illustrated in the accompanying drawings, since the invention is capable of other embodiments and of being practiced or carried out in various ways. Also, it is to be understood that the phraseology or terminology employed herein is for the purpose of description and not of limitation.

GENERAL DESCRIPTION

A marine propulsion device in accordance with the invention can take various forms, such as for instance, an outboard motor or a stern drive unit. Shown in the drawings, and particularly in FIG. 1, is a marine propulsion device in the form of an outboard motor 11 including a propulsion unit 13 and means adapted to be mounted to a boat hull (not shown) and connected to the propulsion unit 13 for providing horizontal and vertical swinging movement of the propulsion unit 13 relative to the boat hull.

More specifically, while other arrangements can be employed, the illustrated outboard motor 11 includes a clamp bracket 17 which is connected through a tilt pin 19 with a swivel bracket 21 to afford vertical swinging of the swivel bracket 21 relative to the clamp bracket 17. In turn, the swivel bracket 21 is connected to the propulsion unit 13 through a king pin 23 so as to afford steering movement of the propulsion unit 13 relative to the swivel bracket 21.

Rotatably carried by the propulsion unit 13 is a propeller shaft 27 (See FIG. 6) which, in turn, carries a propeller 29 (See FIG. 1) for rotation in common with the propeller shaft 27. Also included in the propulsion unit 13 is a drive shaft 31 (See FIG. 6) which extends transversely of the propeller shaft 27 and includes, at the lower end thereof, a bevel gear 32.

Connecting the drive shaft 31 to the propeller shaft 27 is a reversing transmission or clutch 33 which can take various forms and which, in the illustrated contruction, comprises a pair of bevel gears 37 and 39 mounted in spaced relation axially of the propeller shaft 27 and for rotation coaxially with and independently of the propeller shaft 27, and in mesh with the bevel gear 32. Also included in the reversing transmission 33 is a clutch dog 41 which is carried on the propeller shaft 27 intermediate the bevel gears 37 and 39 for common rotation with the propeller shaft 27 and for movement axially of the propeller shaft 27 between a central of neutral position (shown in FIG. 6) out of engagement with the bevel gears 37 and 39, a forward drive position (to the left of the neutral position) in driven rotary engagement with the bevel gear 37, and a rearward drive position (to the right of the neutral position) in driven rotary engagement with the bevel gear 39.

In accordance with the invention, there is provided a mechanical linkage 53 which is effective to positively move the clutch dog 41 between the neutral, forward drive, and rearward drive position. The mechanical linkage 53 includes a shift actuator, member, or part 51 movable axially of the propeller shaft 27 and an actuating rod 57 (See also FIG. 2) supported by the propulsion unit 13 for movement transversely of the propeller shaft 27. While various arrangements are possible, in the illustrated construction, the propeller shaft 27 includes a forwardly open bore 59 which receives the shift actuator 51. At its rearward end, the shift actuator 51 is connected to the clutch dog 41 by a transverse pin 61 which extends through diametrically opposed and elongated slots 63 in the propeller shaft 27. Located adjacent the forward end of the shift actuator 51 is a plunger 67 which is guided for movement axially of the propeller shaft 27 by a bearing or guide means on the propulsion unit 13.

Further in accordance with the invention, means are provided on the plunger 67 and on the rod 57 for effecting movement of the plunger 67 axially of the propeller shaft 27 in response to movement of the rod 57 transversely of the propeller shaft axis. Also in accordance with the invention, there is provided means for positively connecting the shift actuator 51 to the plunger 67 to insure common travel axially of the propeller shaft 27 while affording relative rotation therebetween.

More specifically, while various arrangements can be employed, in the illustrated construction (See FIGS. 6 and 7), the plunger 67 comprises a cylindrical end portion 69 including a bore defined by an annulaar shoulder 71 and a cylindrical wall 73, together with a counterbore 77. Formed in the cylindrical wall 73 is an annular groove which receives a snap ring 79. Located inwardly of and in adjacent relation to the snap ring 79 is a washer 81.

The forward end of the shift actuator 51 exends into the bore and includes an end portion 83 which projects from an annular shoulder 85 and which, at its extreme forward end, includes a threaded part of reduced diameter, which threaded part extends into the counterbore 77 and receives a nut 87 which, after assembly, is staked, or crimped, or otherwise fixed to the threaded part to prevent disassembly.

Located between the nut 87 and the shoulder 85 on the shift actuator 51 and between the shoulder 71 and the washer 89 is a thurst bearing assembly including opposed annular races 89 and 91 and intervening bearing elements 93.

The thurst bearing assembly, together with the associated structure on the shift actuator 51 and in the bore of the plunger 67, affords positive movement of the shift actuator 51 with the plunger 67 axially of the propeller shaft 27, while affording rotary movement therebetween. More specifically, when the plunger 67 is moved to the left as shown in FIG. 6, i.e., to the forward drive position, the washer 81 bears against the annular race 91 and, in turn, the annular race 89 bears against the nut 87. When the plunger 67 is moved to the right as shown in FIG. 6, i.e., to the rearward drive position, the shoulder 71 formed in the bore bears against the annular race 89 and, in turn, the annular race 91 bears against the shoulder 85 formed on the shift actuator 51.

While various arrangements can be provided for displacing the plunger 67 axially of the propeller shaft 27 in response to movement of the rod 53 transversely of the propeller shaft, in the illustrated construction, the left portion of the plunger includes a cam portion 97 which extends from the cylindrical portion, which is generally semi-cylindrical in form, and which includes a substantially diametrically extending face 99 having therein an inclined slot or groove 111 receiving a cam or tang 113 (See FIG. 2) extending at an angle from the generally flat face 117 of a generally sem-cylindrically shaped lower end portion 119 of the rod 57.

As can be seen from the drawings, above and below the tang 113, the rod 57 is supported for travel transversely of the propeller shaft axis. At its upper end, the rod 57 is mechanically connected, as will be more fully explained, to a link 121 which can be displaced by the operator to vertically or axially displace the rod 57 and thereby mechanically and positively displace the shift actuator 51 and connected clutch dog 41 to thereby operate the reversing transmission 33.

More specifically, while various other arrangements can be employed, in the illustrated construction, the link 121 extends vertically in the propulsion unit (See FIG. 1) and through a bore in the king pin 23 to a connection with a shiftable operating lever 123. At its lower end, the link 121 is fixedly connected to a member 127 for common vertical movement, which member 127 in turn, is connected to the rod 57 by means providing limited initial vertical lost motion therebetween followed by common vertical movement. As such lost motion is limited, the linkage 53 nevertheless extends continuously from the operating lever 123 to the clutch dog 41 and is mechanically effective to shift the clutch dog 41, notwithstanding such limited lost motion.

While various arrangements could be employed for connecting the rod 57 to the member 127 so as to provide initial lost motion followed by common motion, in the illustrated construction, the member 127 is generally cylindrical and is located in outward telescopic engagement with an upper portion of the rod 57 and such means further comprises a pin 131 which extends from the rod 57 and through diametrically opposed and slightly elongated slots 133 in the member 127. As will be seen hereinafter, the member also serves as a valve member of a hydraulic means 141 for assisting displacement of the rod 57 so as to effect shifting.

More specifically, while various arrangements can be employed, in accordance with the invention, the means 141 for hydraulically assisting rod displacement, i.e., for assisting shifting action, comprises a cylinder 143 which is fixedly supported by the propulsion unit 13 in encircling relation to the telescopically related rod 57 and valve member 127, together with a piston 147 which includes port means for admitting pressure fluid to cause displacement of the piston 147 relative to the cylinder 143 and consequent concurrent movement of the rod 57 and which is located in outwardly telescopic engagement with the valve member 127 and in inwardly telscopic engagement with the cylinder 143. Also included in the hydraulic assist means 141 is means connecting the piston 147 and the rod 57 for common movement, and means of the valve member 127 movable relative to the port means in the piston 147 to control pressure fluid flow. In addition, means are provided for supplying pressure fluid to the port means under the control of the valve means.

More specifically, the cylinder 143 comprises two, upper and lower, axially spaced cylindrically shaped inner wall surfaces 151 and 153 and a radially inwardly extending boss or flange 157 located between the wall surfaces 151 and 153 and having an inner cylindrical surface 159.

The piston 147 includes two, upper and lower, axially spaced end portions 161 and 163 respectively in telescopic engagement with the cylindrical surfaces 151 and 153 of the cylinder 143, together with an axially extending annular recess 167 located intermediate the piston end portions 161 and 163 and having an outer cylindrical surface 169 engaging the cylindrical surface 159 of the cylinder boss 157. Such engagement divides the recess 167 into upper and lower portions. In the specifically illustrated construction, the upper piston end portion 161 is provided by an annular member 168 which is threaded on a reduced diameter portion 170 of the piston 147. In addition, the axial length of the recess 167 is greater than the axial length of the boss 157 provided in the cylinder 143.

The port means provided in the piston 147 comprises two, upper and lower, axially spaced radially extending ports 171 and 173 which extend from the inner bore of the piston 147, and communicate with the respective ends of the annular recess 167.

In the illustrated construction, the means for supplying pressure fluid comprises a pump 179 driven by the drive shaft 31, together with the provision, in the rod 57, of an axial bore 181 which extends in the upper rod portion 129 which communicates with the pump 179 notwithstanding vertical axial displacement of the rod 57. Also provided are means communicating between the port means in the piston 147 and the bore 181 in the rod 57. It is noted that the upper end of the bore 181 in the rod 57 is closed by a plug 183 (See FIG. 6).

While various arrangements can be employed, in the illustrated construction, the means communicating between the port means in the piston 147 and the bore 181 in the rod 57 comprises a radial opening 187 in the rod 57, which opening 187 communicates with the bore 181 and with a radial bore 189 in the valve member 127 notwithstanding relative axial movement between the rod 57 and the valve member 127. In addition, the valve member 127 includes on the outer surface thereof, an annular axially extending recess 191 which communicates with the radial bore 189 in the valve member 127 and which has an axial length greater than the distance between the relatively adjacent surfaces of the axially spaced ports 171 and 173.

While other constructions can be employed, the valve means comprises axially spaced upper and lower lands 193 and 197 respectively, which lands 193 and 197 are located on the outer surface of the valve member 127, which, at least in part, define the annular recess 191, which cooperate respectively with the ports 171 and 173, and which preferably have an axial length less that the axial length of the ports 171 and 173. As a consequence, when the mechanical linkage 53 is in newtral position, the lands 193 and 197 are located in registry with the ports 171 and 173, but permit fluid flow from the recess 191 to each of the ports 171 and 173 and from each of the ports 171 and 173 to upper and lower axially extending passageways 211 and 213 respectively, thereby permitting simultaneous oil flow out of both ends of the valve for gravity descent to the bottom of the propulsion unit 13. When in the neutral position, the hydraulic forces acting on the piston are balanced and there is, accordingly, no piston movement.

Means are provided for connecting the piston 147 and the rod 57 for common movement. While various arrangements can be employed, in the disclosed construction, such means comprises extension of the pin 131 into fixed engagement with the piston 147. In the specifically illustrated form of the invention, the pin 131 extends diametrically through the rod 57, through the diametrically opposed elongated slots 133 in the valve member 127 and, at both ends, into apertures in the reduced diameter portion 170 of the piston 147. It is noted that, in the illustrated construction, the pin 131 is retained in fixed connection with the piston 147 by the annular member or sleeve 168 which, as already explained, is threaded onto the reduced diameter threaded portion 170 of the piston 147 and prevents axial movement of the pin 131.

It is specifically noted that the pin 131 serves both to provide common vertical movement for both the piston 147 and the rod 57 and to permit initial limited lost motion between the valve member 127 and the rod 57 followed by common movement and to control relative movement between the lands 193 and 197 and the ports 171 and 173, thereby to control valve operation. In addition, the pin 131 serves to prevent relative rotary motion between the piston 147, valve member 127, and the rod 57, thereby assuring continued fluid communication between the bore 181 of the rod 57 and one or both of the piston ports 171 and 173.

Various pumps and arrangements for driving the pump can be employed. In the illustrated construction, the pump is essentially identical to the pump disclosed in U.S. Pat. No. 3,623,583, issued Nov. 30, 1971.

More specifically, the propulsion unit 13 includes a pump housing 221 defining a pumping chamber 223 in which there is rotatable an impeller 227 fixed to a hub 229 extending from the forward bevel gear 37.

Connected to the front of the pump housing 221 is a pump cover 231 which includes a horizontally extending bore 233 coaxial with the propeller shaft 27, which bore 233 receives and guides the plunger 67 for movement. Extending transversely of the horizontal bore 223 is a second or vertical bore 237 which diametrically intersects the horizontal bore 223 and receives and guides movement of the lower end of the rod 57.

Extending from the forward face of the cover 231 and through the cover 231 and around the vertical bore 237 is one or more fluid inlet passages which includes a kidney-shaped portion 241 communicating with the lower half of the pumping chamber 223.

Extending in the upper part of the housing cover 231 is a fluid outlet passage which includes a kidney-shaped portion 247 communicating with the upper half of the pumping chamber 223 and with a fluid outlet port 249 which communicates with the vertical bore 237 remotely from the intersection with the horizontal bore 233. In turn, the rod 57 includes, at the lower end of the bore 181, a port 251 (See FIG. 2) communicating with an annular recess 253 in the outer surface of the rod 57, which annular recess 253 has an axial length such as to maintain communication with the port 249 in the pump housing cover 231 notwithstanding vertical movement of the rod 57.

Means are provided for preventing excessive build up of pressure in the hydraulic system. While various arrangements can be employed, in the illustrated construction, such pressure release means comprises provision, in the pump housing 221, of a passageway 261 which communicates with the outlet passage portion 241 and includes an exit port 263 affording fluid flow to the sump. Included in the pressuure relief passageway 261 is a ball check 267 which is biased against an annular seat 269 by a spring 271 retained by a plug 273 in a threaded opening.

In order to facilitate operation, means are included (See FIG. 6) for providing limited restraint to movement of the mechanical linkage 53 from the neutral position so as thereby to afford the operator a "feel" for neutral and to thereby also prevent wear by simultaneously preventing movement of the clutch dog 41 from neutral in the absence of a force of a predetermined amount acting through the rod 57, plunger 67, and shift actuator 51. In other words, in accordance with the invention, the clutch dog 41 is mechanically shiftable from neutral only in the event of the transmission of such predetermined force through the mechanical linkage 53. However, such predetermined force is considerably above the force required to displace the valve member and, as a consequence, the clutch dog 41 will normally be selectively driven into engagement with the bevel gears 37 and 39 under the influence of a still greater hydraulic force which is generated by the action of the hydraulic fluid in the piston recess 167. Such hydraulic force will assure rapid and full engagement of the clutch dog 41 with the bevel gears 37 and 39 to thereby avoid such wear as occurs due to incomplete engagement and due to slow engagement of the clutch dog 41 with the bevel gears 37 and 39.

While various arrangements can be employed, in the illustrated construction, such means includes provision in the shift actuator 51 of an axial bore 279 which is rearwardly open, together with a diametric bore 281 which intersects the axial bore 279 at the front end thereof. Captured in the diametric bore 281 are two spaced balls or spheres 283 which are engaged by a center ball or sphere 287 located adjacent to the forward end of the axial bore 279. The center sphere 287 is biased forward by a spring 288 so as to urge the spaced spheres 283 radially outwardly and into an annular detent groove or pocket 289 in the bore 59 of the propeller shaft 27. More specifically, at its forward end, the spring 288 is seated against the center sphere 287 and, at its rearward end, the spring 288 is seated against the pin 61 connecting the shift actuator 51 to the clutch dog 41. Accordingly, whenever the shift actuator 51 moves to the neutral position, the spring 288 will serve to displace the spaced spheres 283 radially outwardly into the detent groove 289, thereby requiring a force of predetermined amount to thereafter displace the shift actuator 51 relative to the propeller shaft 27.

In operation, assuming the link 121 to be in neutral position, engine operation causes rotation of the drive shaft 31 which, in turn, drives the forward bevel gear 37 which, in turn, drives the pump impeller 227 causing pressure fluid flow from the pumping chamber 223 through the fluid outlet port 249 to the bore 181 in the rod 57. From the bore 181 in the rod 57, the pressure fluid flows through the radial opening 187 in the rod 57 and through the radial opening 189 in the valve member 127 into the axially extending recess 191 between the lands 193 and 197.

As the valve member 127 has common movement with the link 121, the valve member 127 is in neutral, with the pin 131 located centrally of the slots 133, and fluid flow is permitted past both lands 193 and 197 into each of the ports 171 and 173 and out of each of the ports 171 and 173 into the respective axial passageways 211 and 213. Fluid flowing from the passageways 211 and 213 drops by gravity into the propulsion unit bottom which acts as a sump communicating with the pump inlet passage.

When it is desired to shift into forward, the link 121 is displaced downwardly, which displacement initially causes common downward movement of the link 121 and valve member 127 relative to the connected rod 57 and piston 147 until the pin 131 is located adjacent the upper end of the slots 133 in the valve member 127. Such valve member movement locates the lower land 197 so as to close off communication between the lower axial passageway 213 and the lower port 173 and to permit relatively unrestricted flow from the annular recess 191 to the lower port 173. At the same time, the upper land 193 closes off communication between the annular recess 191 and the upper port 171 and provides relatively unrestricted communication between the upper axial passageway 211 and the upper port 171.

Such action pressurizes the area in the cylinder 143 below the boss 157, i.e., in the lower part of the piston recess 167 and causes movement of the piston 147 downwardly relative to the cylinder 143, thereby also causing common downward movement of the rod 57, which rod movement occurs concurrently with continued downward movement of the link 121 and which rod movement is effective to shift the plunger 67 to the left and thereby engage the clutch dog 41 with the forward bevel gear 37 to rotate the propeller shaft 27 in the direction affording forward drive.

During downward displacement of the rod 57, to the position effecting forward engagement of the clutch dog 41 with the forward bevel gear 37, the relationship of the valve member 127 to the piston 147 does not change as the rod 57, valve member 127, and piston 147 all move in unison. When in forward drive, the pin 131 is located at the upper end of the slots 133 and the pressure in the lower portion of the recess 167 is continued by action of the pump 179 subject to pressure relieving operation of the ball check 267.

When it is desired to again place the clutch in neutral position, the link 122 is displaced upwardly to its neutral position. During the initial part of such movement, the valve member 127 will be initially moved upwardly relative to the rod 57 and piston 147 until the pin 131 is located adjacent to the bottom of the slots 133 and so as to close off communication between the annular recess 191 and the lower port 173 and so as to permit relatively unrestricted flow from the lower port 173 to the lower axial passageway 213. At the same time, the upper land 193 closes off communication between the upper axial passageway 211 and the upper port 171 and provides relatively unrestricted communication between the annular recess 191 and the upper port 171. Such action pressurizes the area in the cylinder 143 above the boss 157, i.e., in the upper part of the piston recess 167 and causes movement of the piston 147 upwardly relative to the cylinder 143, thereby also causing common upward movement of the rod 57, which rod movement occurs concurrently with continued upward link movement, and which rod movement is effective to shift the plunger 67 to the right and thereby disengage the clutch dog 41 from the forward bevel gear 37.

When upward movement of the link 121 is terminated because of arrival at the neutral position, fluid pressure entering into the upper portion of the recess will continue to cause the piston 147 to move upwardly relative to the valve member 127 until such time as both ports 171 and 173 are simultaneously in communication with the recess 191 in the valve member 127 and with the upper and lower axially extending passageways 211 and 213. When such communication occurs, the forces acting on the piston will be balanced and the rod 57 will be in neutral position locating the clutch dog 41 in neutral position and the pin 131 will be located centrally of the slots 133.

If it is desired to shift from forward to reverse, the link 121 is, of course, displaced upwardly beyond the neutral position to the reverse position and the hydraulic action will continue upward movement of the piston 147 until such time as the clutch dog 41 is fully seated against the rearward bevel gear 39. In such position the link 121 will be located in its reverse position with the pin 131 being located adjacent to the lower end of the slots 133 in the valve member 127. In addition, when in rearward drive, pressure in the upper portion of the recess 167 is continued to maintain engagement of the clutch dog 41 with the bevel gear 39 by action of the pump 179 subject to pressure relieving operation of the ball check 267. In this last regard, it is noted that the pump 179 is operative to supply pressure fluid whenever the engine is operating.

Movement of the link 121 from the reverse position toward the neutral position will initially cause common downward movement of the link 121 with the valve member 127 such that the lands 193 and 197 move relative to the ports 171 and 173 so as to admit pressure fluid to the lower portion of the piston recess 169 and to drain pressure fluid from the upper portion of the piston recess 169 in the manner already explained. Such action causes downward movement of the piston 147 relative to the cylinder 143 and concurrent downward movement of the rod 157, which rod movement is effective to move the clutch dog 41 from the right to the left. Movement of the link 121 can be terminated at the neutral position, or the hydraulic assist can be continued beyond neutral in the event that the link 121 is displaced from reverse to forward.

If for any reason, there is a failure in the hydraulic means, the reversing mechanism is still mechanically operable through operation of the mechanical linkage.

At least some of the features of the invention, can be obtained when the disclosed shifting mechanism is located in a marine propulsion device elsewhere than as illustrated in the drawings.

Various of the features of the invention are set forth in the following claims.

I claim:

1. A marine propulsion device comprising a propulsion unit, means adapted to be mounted to a boat hull and connected to said propulsion unit for providing horizontal and vertical swinging movement of said propulsion unit relative to said means adapted to be mounted on a boat hull, a propeller shaft rotatably mounted in said propulsion unit, a propeller carried by said propeller shaft, a drive shaft rotatably mounted in said propulsion unit, a reversing transmission connecting said drive shaft to said propeller shaft and shiftable between a neutral condition and a drive condition and including a clutch dog mounted on said propeller shaft for common rotary movement with said propeller shaft and for axial movement relative to said propeller shaft, a mechanical linkage extending is said propulsion unit and connected to said reversing transmission for operating said reversing transmission in response to movement of said mechanical linkage, said linkage including a member carried by said propeller shaft for common rotary movement with said propeller shaft and for axial movement relative to said propeller shaft and connected to said dog for common movement therewith, a rod supported by said propulsion unit for movement transversely of said member, and means mechanically connecting said rod and said member for effecting movement of said member in one direction axially of said propeller shaft in response to movement of said rod in one direction transversely of said propeller shaft and for effecting movement of said member in the other direction axially of said propeller shaft in response to movement of said rod in the other direction transversely of said propeller shaft and for simultaneously permitting rotary movement of said member relative to said rod.

2. A marine propulsion device in accordance with claim 1 wherein said connecting means comprises a plunger mounted on said propulsion unit for movement axially of said propeller shaft, means on said plunger and on said member connecting said plunger and said member for rotary movement therebetween and for common movement axially of said propeller shaft, and interengaging means on said plunger and on said rod for effecting movement of said plunger in one direction axially of said propeller shaft in response to movement of said rod in one direction transversely of said propeller shaft and for effecting movement of said member in the other direction axially of said propeller shaft in response to movement of said rod in the other direction transversely of said propeller shaft.

3. A marine propulsion device in accordance with claim 1 including hydraulic means actuated in response to initial movement of said mechanical linkage for assisting in moving said mechanical linkage to operate said reversing transmission.

4. A marine propulsion device comprising a propulsion unit, means adapted to be mounted to a boat hull and connected to said propulsion unit for providing horizontal and vertical swinging movement of said propulsion unit relative to said means adapted to be mounted on a boat hull, a propeller shaft rotatably mounted in said propulsion unit, a propeller carried by said propeller shaft, a drive shaft rotatably mounted in said propulsion unit, a reversing transmission connecting said drive shaft to said propeller shaft and shiftable between a neutral condition and a drive condition, a mechanical linkage extending in and supported by said propulsion unit and connected to said reversing transmission for operating said reversing transmission in response to movement of said mechanical linkage, said mechanical linkage including a rod movable in said propulsion unit and operably connected to said transmission and a member mounted in said propulsion unit in outward telescopic relation to said rod for movement parallel to said rod, and means connecting said member and said rod for providing initial lost movement therebetween and thereafter for providing common movement of said rod and said member in response to movement of said member, and hydraulic means actuated in response to initial movement of said mechanical linkage for assisting in moving said mechanical linkage to operate said reversing transmission, said hydraulic means comprising a cylinder fixed in said propulsion unit in encircling relation to said rod and said member and including spaced end portions having cylindrical wall surfaces and a radially inwardly extending boss located intermediate said cylinder end portions and including a cylindrical wall surface, said hydraulic means also including a piston in outwardly telescopic engagement with said member and in inwardly telescopic engagement with said cylinder, said piston including spaced end portions telescopically engaged with said cylindrical wall surfaces of said cylinder end portions, a recess having a length axially of said cylinder greater than the length of said boss and having an outer cylindrical surface telescopially engaged with said boss cylindrical wall surface, and a pair of spaced ports located adjacent to the axial ends of said piston recess for admitting pressure fluid to cause displacement of said piston relative to said cylinder, and means connecting said piston and said rod for common movement.

5. A marine propulsion device in accordance with claim 4 wherein said member also constitutes a part of said hydraulic means and has connected thereto valve means operable to control actuation of said hydraulic means in response to movement of said member.

6. A marine propulsion device in accordance with claim 4 wherein said hydraulic means further includes valve means on said member movable relative to said spaced ports to control pressure fluid flow relative thereto, and means for supplying pressure fluid to said spaced ports under the control of said valve means.

7. A marine propulsion device in accordance with claim 6 wherein said means for supplying pressure fluid comprises a pump driven by said drive shaft, a bore in said rod communicating with said pump notwithstanding rod movement relative to said pump, and means in said rod and said member communicating between said bore in said rod and said spaced ports notwithstanding relative movement between said rod and said member.

8. A marine propulsion device in accordance with claim 7 wherein said means communicating between said bore in said rod and said spaced ports comprises an opening in said rod communicating with said bore, a recess in said member communicating with said opening notwithstanding relative movement between said actuating member and said rod, and wherein said valve means comprises lands located on said member to control fluid communication between said recess and said spaced ports in response to movement of said member relative to said piston during initial movement of said member relative to said rod.

9. A marine propulsion device in accordance with claim 4 wherein said member includes a pair of lands spaced on said member at the same spacing as said ports, said lands each having, in the direction of member movement, a length less than the length of said ports.

10. A marine propulsion device in accordance with claim 9 wherein said lands are centered with respect to said ports when said transmission is in neutral condition.

11. A marine propulsion device in accordance with claim 10 wherein said means connecting said rod and said piston for common movement permits relative movement between said member and said piston to control location of said lands relative to said ports.

12. A marine propulsion device comprising a propulsion unit, means adapted to be mounted to a boat hull and connected to said propulsion unit for providing horizontal and vertical swinging movement of said propulsion unit relative to said means adapted to be mounted on a boat hull, propeller shaft rotatably mounted in said propulsion unit, a propeller carried by said propeller shaft, a drive shaft rotatably mounted in said propulsion unit, a reversing transmission connecting said drive shaft to said propeller shaft and shiftable between a neutral condition and a drive condition, a mechanical linkage extending in and supported by said propulsion unit and connected to said reversing transmission for operating said reversing transmission in response to movement of said mechanical linkage, said linkage including releasable means for preventing linkage movement from the position locating said transmission in neutral condition in the absence of a force above a predetermined amount, and including an axial bore in said propeller shaft, a part axially movable in said propeller shaft bore, a pocket in the wall of said propeller shaft bore, a first bore in said part located for registry with said pocket when said transmission is in neutral condition, a ball in said first bore in said part, and means yieldably urging said ball radially outwardly of said first bore in said part and partially into said pocket, whereby said ball is located partially in said pocket and partially in said first bore in said part when said transmission is in neutral condition, and hydraulic means actuated in response to initial movement of said mechanical linkage for assisting in moving said mechanical linkage to operate said reversing transmission.

13. A marine propulsion device in accordance with claim 12 wherein said means yieldably urging said ball radially outwardly of said first bore in said part includes an axial bore extending in said part from said first bore, another ball in said axial bore in engagement with said ball in said first bore, and means urging said other ball in said axial bore so as to radially outwardly displace said ball in said first bore.

14. A marine propulsion device in accordance with claim 13 wherein said means for displacing said other ball in said axial bore comprises a spring seated, at one end, against said other ball and fixed means in said axial bore engaged with the other end of said spring.

15. A marine propulsion device comprising a propulsion unit having at the lower end thereof, a gear box portion, a propeller shaft rotatably mounted in said gear box portion, a propeller carried by said propeller shaft, a drive shaft rotatably mounted in said propulsion unit and extending into said gear box portion, a hydraulic pump located in said gear box portion and driven by said drive shaft, a reversing transmission located in said gear box portion and connecting said drive shaft to said propeller shaft and shiftable axially of said propeller shaft between a neutral condition and a drive condition, a mechanical linkage extending on a movably supported by said propulsion unit and connected to said reversing transmission for mechanically shifting said reversing transmission in response to linkage movement, said mechanical linkage including an elongated rod mounted for vertical lengthwise movement and having a lower end extending into said gear box portion and operatively connected to said transmission for shifting thereof in response to lengthwise rod movement, said rod including a bore extending lengthwise therein and communicating with said pump notwithstanding lengthwise rod movement, hydraulic means communicating with said bore in said rod notwithstanding lengthwise rod movement and connected to said mechanical linkage and actuated in response to initial movement of said mechanical linkage for assisting in providing lengthwise rod movement to shift said reversing transmission, and means adapted to be mounted to a boat hull and connected to said propulsion unit for providing horizontal and vertical swinging movement of said propulsion unit relative to said means adapted to be mounted on a boat hull.

16. A marine propulsion device in accordance with claim 15 wherein said pump includes a member mounted for rotation coaxially with said propeller shaft.

17. A marine propulsion device in accordance with claim 16 wherein said reversing transmission includes an element mounted for rotation coaxially with said propeller shaft, driven by said drive shaft, and drivingly connected to said pump member.

18. A marine propulsion device in accordance with claim 15 wherein said hydraulic means includes a cylinder-piston assembly including a cylinder member and a piston member movable relative to each other and wherein said rod is fixedly connected to one of said cylinder and piston members.

19. A marine propulsion device in accordance with claim 18 wherein said mechanical linkage includes a part mounted in said propulsion unit for movement parallel to said rod, extending upwardly from the upper end of said rod, and being adapted to be displaced by a remote operator, and further including means connecting said part and said rod for providing initial lost movement therebetween and thereafter for providing common movement of said rod and said part in response to movement of said part.

20. A marine propulsion device in accordance with claim 19 wherein said cylinder piston assembly includes a fluid cavity between said piston member and said cylinder member, and said part includes a portion providing a valve between said bore in said rod and said fluid cavity.

21. A marine propulsion device in accordance with claim 20 wherein said portion of said part functions as a valve during lost movement between said part and said rod and in response to relative movement between said part and said one of said cylinder member and said piston member which is fixed to said rod.

22. A marine propulsion device comprising a propulsion unit, a propeller shaft rotatably mounted in said propulsion unit, a propeller carried by said propeller shaft, a drive shaft rotatably mounted in said propulsion unit, a hydraulic pump driven by said drive shaft, a reversing transmission connecting said drive shaft to said propeller shaft and shiftable axially of said propeller shaft between a neutral condition and a drive condition, a mechanical linkage extending on and movably supported by said propulsion unit and connected to said reversing transmission for mechanically shifting said reversing transmission in response to linkage movement, said mechanical linkage including an elongated rod having an upper end and extending upwardly from an operating connection with said transmission and movable transversely of said propeller shaft, said rod including a bore communicating with said pump notwithstanding rod movement, said mechanical linkage also including a member mounted in said propulsion unit for movement parallel to said rod, extending upwardly from said upper end of said rod, and being adapted to be displaced by a remote operator, and means connecting said member and said rod for providing initial lost movement therebetween and thereafter for providing common movement of said rod and said member in response to movement of said member, hydraulic means communicating with said bore notwithstanding rod movement and connected to said mechanical linkage and actuated in response to initial movement of said mechanical linkage for assisting in moving said mechanical linkage to shift said reversing transmission, and means adapted to be mounted to a boat hull and connected to said propulsion unit for providing horizontal and vertical swinging movement of said propulsion unit relative to said means adapted to be mounted on a boat hull.

23. A marine propulsion device in accordance with claim 22 wherein said pump includes a member mounted for rotation coaxially with said propeller shaft.

24. A marine propulsion device in accordance with claim 23 wherein said reversing transmission includes an element mounted for rotation coaxially with said propeller shaft, driven by said drive shaft, and drivingly connected to said pump.

25. A marine propulsion device in accordance with claim 22 wherein said hydraulic means includes a cylinder-piston assembly including a cylinder member and a piston member movable relative to each other and wherein said rod is fixedly connected to one of said cylinder and piston members.

26. A marine propulsion device in accordance with claim 25 wherein said cylinder piston assembly includes a fluid cavity between said piston member and said cylinder member and said part includes a portion providing a valve between said bore in said rod and said fluid cavity.

27. A marine propulsion device in accordance with claim 26 wherein said portion of said part functions as a valve during lost movement between said part and said rod and in response to relative movement between said part and said one of said cylinder member and said piston member which is fixed to said rod.

* * * * *